United States Patent
Clements (10) Patent No.: US 6,858,052 B2
(45) Date of Patent: Feb. 22, 2005

(54) FILTER CARTRIDGE MOUNTING STRUCTURE

(75) Inventor: Jack Thomas Clements, Lee's Summit, MO (US)

(73) Assignee: BHA Group, Inc., Kansas City, MO (US)

( * ) Notice: Subject to any disclaimer, the term of this patent is extended or adjusted under 35 U.S.C. 154(b) by 0 days.

(21) Appl. No.: 10/448,693

(22) Filed: May 30, 2003

(65) Prior Publication Data

US 2004/0237483 A1 Dec. 2, 2004

(51) Int. Cl.$^7$ ............................................... B01D 29/17
(52) U.S. Cl. ........................ 55/377; 55/378; 55/341.1; 55/508; 55/374; 55/376; 55/509; 55/DIG. 26; 55/95; 55/273
(58) Field of Search ............................... 55/341.1, 374, 55/376, 378, 508, 509, DIG. 26, 377; 95/273

(56) References Cited

U.S. PATENT DOCUMENTS

| | | | |
|---|---|---|---|
| 4,042,356 A | * | 8/1977 | Miller ........................ 55/341.1 |
| 4,272,263 A | * | 6/1981 | Hancock ...................... 55/377 |
| 4,292,057 A | | 9/1981 | Ulvestad et al. |
| 4,424,070 A | | 1/1984 | Robinson |
| 4,436,536 A | | 3/1984 | Robinson |
| 4,443,237 A | | 4/1984 | Ulvestad |
| 4,445,915 A | | 5/1984 | Robinson |
| 5,632,791 A | | 5/1997 | Oussoren et al. |
| 5,746,792 A | | 5/1998 | Clements et al. |
| 5,785,724 A | * | 7/1998 | Johnson ........................ 55/377 |
| 5,904,743 A | * | 5/1999 | Jensen ........................ 55/341.1 |
| 6,149,716 A | * | 11/2000 | Bach et al. .................... 95/280 |
| 6,179,888 B1 | * | 1/2001 | Mangiaforte ................ 55/341.1 |
| 6,203,591 B1 | * | 3/2001 | Clements et al. .......... 55/341.1 |

FOREIGN PATENT DOCUMENTS

EP 1 062 997 A2 12/2000

OTHER PUBLICATIONS

WAM GmbH Dust Collectors literature 035/94.1.
WAMECO Spare Parts, p. 03505.R. 24.

* cited by examiner

Primary Examiner—Minh-Chau T. Pham
(74) Attorney, Agent, or Firm—Greg Strugalski (57) ABSTRACT

A filter cartridge for use in a baghouse having a tubesheet with a plurality of opening. A flexible snapband is biased towards engagement with a surface defining one of the openings in the tubesheet and is adapted to receive a portion of the filter cartridge. The snapband has a first surface and a second surface with a pair of protrusions separated by a groove adapted to receive a peripheral edge of one of the tubesheet opening. The pair of protrusions sealingly engage surfaces of the tubesheet. The filter cartridge includes filter media. Structure supports the filter media. A rigid non-metallic tubular collar is integrally formed with the filter media and the structure to secure this filter media and the structure to said collar. The collar includes a pair of longitudinally spaced continuous projections extending radially from the collar. The collar further includes an annular surface extending from the collar for establishing the position of the filter cartridge relative to the tubesheet The collar is adapted to be positioned within the snapband and engage the first surface of the snapband to effect sealing engagement of the snapband against a portion of the opening in the tubesheet. The first projection extends radially the said collar to further force a portion of the snapband into sealing engagement with a surface of the tubesheet. The second projection further forces another portion of the snapband into sealing engagement with another surface of the tubesheet.

19 Claims, 6 Drawing Sheets

FILTER CARTRIDGE MOUNTING STRUCTURE

BACKGROUND OF THE INVENTION

1. Technical Field

The present invention is generally directed to a filter assembly for use in a dust collector. In particular, the present invention is directed to a filter cartridge and structure for mounting and supporting the filter assembly in the dust collector.

2. Description of the Prior Art

Dust collectors, such as baghouses, for filtering particulate-laden air are well known. A typical baghouse has a housing with a clean air chamber and a dirty air chamber. The two chambers are separated by sheet metal, commonly referred to as a tubesheet. The tubesheet has a number of openings through which cylindrical filters, such as bags or cartridges, extend. The filters are suspended by the tubesheet and extend into the dirty air chamber. Particulate-laden air is introduced into the dirty air chamber. The air passes through the filters and through the openings in the tubesheet into the clean air chamber. The particulates collect on the exterior surfaces of the filters. The cleaned air is exhausted from the clean air chamber into the environment, or recirculated for other uses.

Important in the design of a filter bag or cartridge and its support structure is that a good seal exists between each filter and the tubesheet. If a good seal does not exist, particulate-laden air will leak around the filter, through the tubesheet opening and into the clean air chamber. This leakage results in contaminated air in the clean air chamber. The filters also require periodic replacement and it is important that the filters are easily removable and replaceable.

Numerous attempts have been made to develop a baghouse filter and supporting structure for attaching a filter element to a baghouse tubesheet. U.S. Pat. Nos. 4,292,057; 4,424,070; 4,436,536; 4,443,237 and 4,445,915 are representative examples of prior art filter elements and attachment structure. U.S. Pat. No. 5,632,791 discloses a flexible sleeve molded from relatively soft urethane material. U.S. Pat. No. 5,746,792 discloses a metallic end collar that is engagable with a flexible gasket for sealing against a tubesheet.

In spite of prior art attempts at solving the problems and disadvantages with prior art filters, the prior art filters and associated structure for attaching the filters to a baghouse tubesheet tend to be complex, which adds to the cost of the filter and installation in the baghouse. The prior art filters also have not been altogether satisfactory in preventing particulate-laden air from leaking from the dirty air chamber, through the tubesheet opening, and into the clean air chamber. The mounting and sealing of filters within a baghouse tubesheet remains one of the most time-consuming and expensive operations in the manufacture of baghouses and in the replacement of filters.

Prior art filters and their support structure also present problems when the filters require replacement. It is common for workers to walk on the upper surface of the tubesheet, and even on the top of the filter support structures, during periodic checking or replacement of the filters. It has been found that, walking on the tubesheet and filter support structures often causes the sealing structure to deform or contort, thus breaking its seal with the tubesheet and resulting leaks between the dirty air and clean air chambers of the baghouse.

Prior art filters with metal support structure can be expensive to manufacture. The metal support structure can also take a relatively long time to fabricate. Accordingly, the need exists for a filter and supporting structure which is inexpensive to quickly manufacture, easy to install and replace in a baghouse and that maintains a good seal. The present invention fills these and other needs, and overcomes the drawbacks of the prior art.

SUMMARY OF THE INVENTION

The present invention is directed to a filter for use in a baghouse having a tubesheet with a plurality of openings. A flexible snapband assembly is adapted to receive the filter and is biased towards engagement with a surface defining one of the openings in the tubesheet. The snapband has a first surface and a second surface with a pair of protrusions separated by a groove adapted to receive a peripheral edge of one of the tubesheet openings. The pair of protrusions sealingly engage surfaces of the tubesheet. The filter includes filter media. Structure supports the filter media. A rigid non-metallic tubular collar is integrally formed with the filter media and the structure to secure the filter media and the structure to the collar. The collar includes a pair of longitudinally spaced continuous radially extending projections. The collar further includes an annular surface extending from the collar for establishing the position of the filter cartridge relative to the tubesheet. The collar is adapted to be positioned within the snapband and the projections engage the first surface of the collar to effect sealing engagement of the snapband against a portion of the opening in the tubesheet. A first one of the projections extends radially from the collar to further force one portion of the snapband into sealing engagement with a surface of the tubesheet. A second projection extends radially from the collar to further force another portion of the snapband into sealing engagement with another surface of the tubesheet.

The collar is molded from a plastic material to capture portions of the filter media and the structure. The molded collar has a hardness of at least Shore D 30. The first projection is adapted to be located above the thickness midpoint of the tubesheet to further force a first one of the protrusions of the snapband into sealing engagement with the surface of the tubesheet. The second projection is adapted to be located below the thickness midpoint of the tubesheet to further force another one of the protrusions of the snapband into sealing engagement with the other surface of the tubesheet.

BRIEF DESCRIPTION OF THE DRAWINGS

Further features of the present invention will become apparent to those skilled in the art to which the present invention relates from reading the following description with reference to the accompanying drawings, in which.

DESCRIPTION OF A PREFERRED EMBODIMENT

Figure 1:
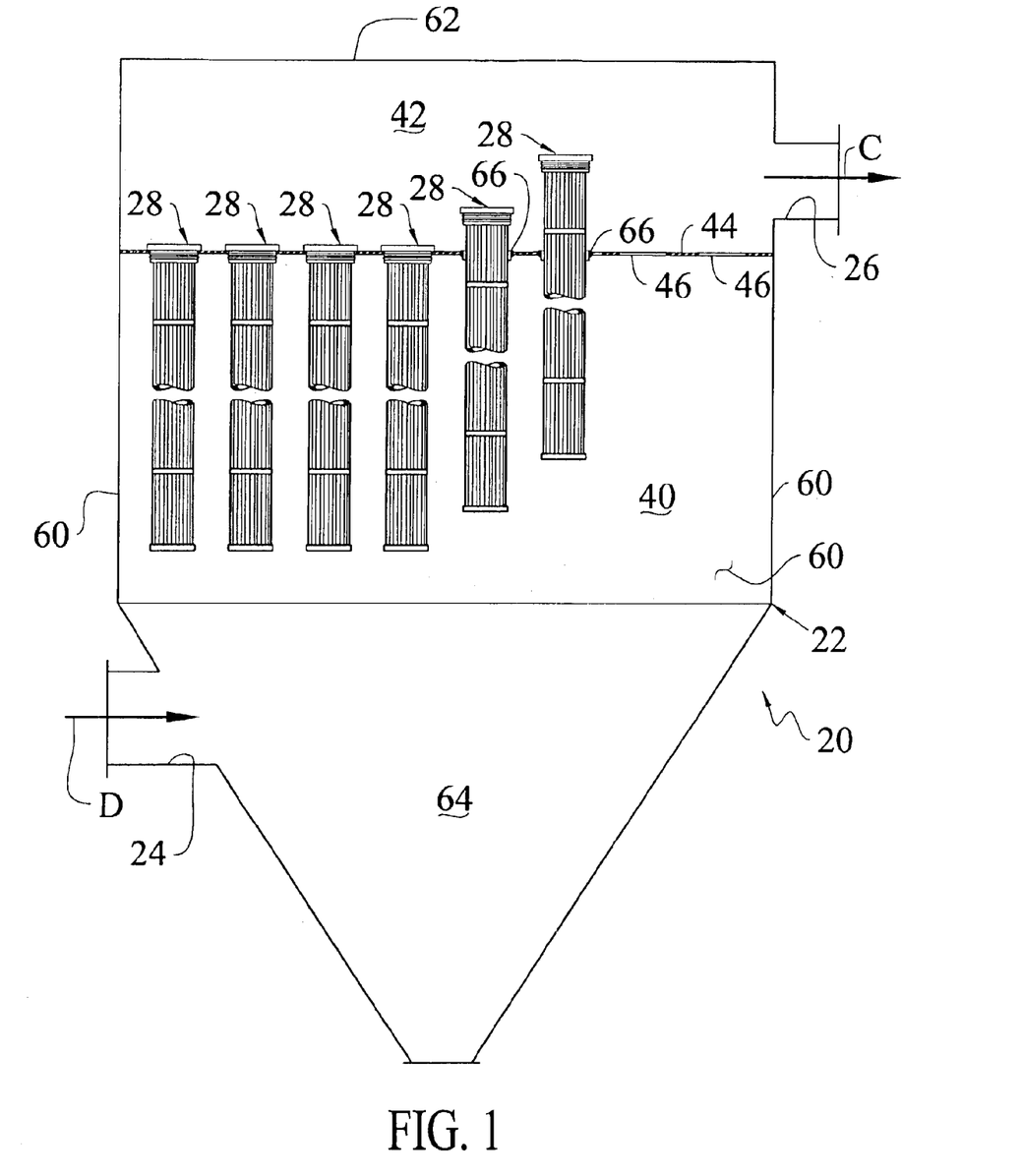
FIG. 1 is a schematic view, partly in section, of a baghouse with filter cartridges constructed according to the present invention.

A baghouse 20 incorporating a filter assembly 28 constructed according to the present invention is illustrated in FIG. 1. The baghouse 20 is defined by an enclosed housing 22. The housing 22 is made from a suitable material, such as sheet metal. Dirty or particulate laden gas D enters the baghouse 20 through an inlet 24. The particulate laden gas D is filtered by a plurality of filter assemblies 28 (FIG. 2) of the present invention installed in the baghouse 20. Particulates are removed from the gas flow at the exterior surface of the filter assemblies 28. Cleaned gas C then flows through from the interior of the filter assemblies 28 and exits the baghouse 20 through an outlet 26.

The baghouse 20 is divided into a "dirty air" plenum 40 and a "clean air" plenum 42 by a tubesheet 44 made from a suitable material, such as a metal plate or sheet. The tubesheet 44 has at least a portion that is substantially planar for mounting and supporting the filter assemblies 28. The inlet 24 is in fluid communication with the dirty air plenum 40. The outlet 26 is in fluid communication with the clean air plenum 42.

A plurality of openings 46 extend through the planar portion of the tubesheet 44. Each opening 46 in the tubesheet 44 has an effective diameter D0 (best seen in FIG. 3), defined by the inner surface of the opening, through which a portion of the filter assembly 28 can be moved. The tubesheet 44 has a thickness T adjacent the opening 46 and a midpoint of the thickness T is located in plane M.

The housing 22 (FIG. 1) of the baghouse 20 includes sides 60 and a roof 62. The baghouse 20 also has an accumulation chamber 64 defined by sloped walls located at a lower end of the dirty air plenum 40. The filter assemblies 28 are illustrated as extending a distance that approaches the accumulation chamber 64. It will be apparent that the filter assemblies 28 may extend into the accumulation chamber 64.

A resilient mounting gasket or "snapband" 66 (FIGS. 2–5) is located in the opening 46 in the tubesheet 44. The snapband 66 includes a metal component, such as a stainless steel U-shaped retainer 68. The retainer 68 is covered with a slightly compressible fabric 80. The snapband 66 may also include a spring member 82 to outwardly bias the retainer 68 and a resiliently compressible cushion 84.

The snapband 66 is constructed with an outer diameter D1 (FIG. 3) that is substantially equal to the inner diameter D0 of the opening 46. The snapband 66 may be easily deformed and manually inserted into the opening 46 prior to receiving the filter assembly 28. The exterior surface of the snapband 66 snugly engages the surface defining the opening 46 with protrusions 100, 102 of the retainer 66 that span the tubesheet 44. The snapband 66 has an inner diameter D2 when installed in the opening 46 of the tubesheet 44. The snapband 66 functions as a seal between the filter assembly 28 and the opening 46 in the tubesheet 44. The snapband 66 is described in detail in U.S. Pat. No. 5,746,792, which is assigned to the assignee of the present invention and is incorporated herein by reference. It will also be understood that the described snapband assembly could be substituted with other snapband assembly configurations.

The filter assembly 28 filters particulates at its exterior surface from the particulate laden gas D as the gas passes radially inward through each filter assembly. The illustrated filter assembly 28 is in the form of a cartridge but could be in the form of a "bag" or other suitable configuration. Each filter assembly 28 is supported at its upper end (as viewed in FIGS. 1–5) by the tubesheet 44 and snapband 66 and extends downwardly in a substantially vertical direction. It will be apparent that the filter assembly 28 could be oriented in any direction.

A tubular mounting sleeve or collar 120 is located at the upper end (as viewed in FIGS. 2 and 3) of the filter assembly 28 and supports the entire weight of the filter assembly. The collar 120 is adapted to be located within and extend through a respective opening 46 in the tubesheet 44 and the snapband 66. The collar 120 of the filter assembly 28 defines an open end of the upper filter portion for gas to flow through.

The filter assembly 28 includes a perforated support structure or tube 140. The tube 140 is made of any suitable material such as plastic or metal. A pleated element 142 is located concentrically around the tube 140. The tube 140 supports the pleated element 142 in a radial direction. The pleated element 142 is formed in a substantially tubular shape about the outer perimeter of the tube 140 with accordion folds at its inner and outer peripheries. The pleated element 124 may be constructed of any suitable material for a desired filtering requirement. Each filter assembly 28 has a longitudinal central axis A.

The upper ends of the tube 140 and pleated element 142 are located in a groove 144 of the collar 120 during molding of the collar 120 to seal and retain the pleated element and the support tube. It will be apparent that the pleated element 126 could be located radially inward of the tube 140.

Figure 2:
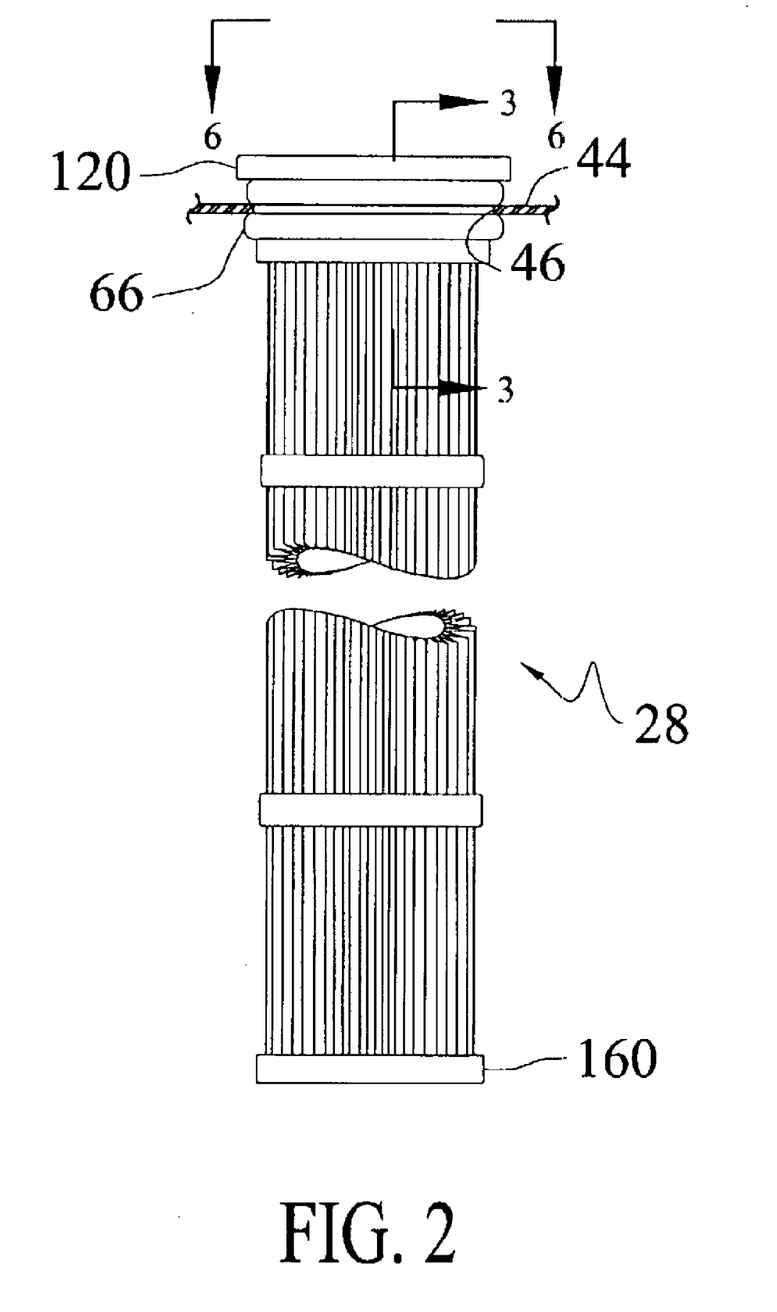
FIG. 2 is an elevational view of one of the filter cartridges illustrated in FIG. 1 installed in an opening of a tubesheet of the baghouse.

It will be appreciated that tube 140, shown as a perforated sleeve, may be substituted with a cage and the pleated element 142 may be substituted for a "bag". In this regard, the term core is meant to encompass any conventional element upon which filter media is wrapped and through which air may flow, such as a perforated sleeve or a cage. Filter assembly 28 has a molded lower end cap, 160 (FIG. 2). The pleated element 142 and tube 140 are molded in the end cap 160 preferably by the same rigid non-metallic material as the collar 120, such as plastic, epoxy, ceramic, silicone, or urethane composition.

The collar 120 is integrally formed with the pleated element 142 and tube 140 during a molding operation to provide a "unitary" cartridge. Thus, the tube 140 and pleated element 142 are structurally and sealingly secured to the collar 120. The collar 120 has an outer diameter D2 (FIG. 3) that is greater than the effective inner diameter D2 of the snapband 66 and opening 46. The collar 120 is made from a material that is rigid and non-metallic.

The collar 120 is preferably molded from a plastic material. It will be apparent that any suitable rigid non-metalic material can be used, such as a plastic, epoxy, ceramic, silicone, or urethane composition. The molded collar 120 has a hardness of at least Shore D 30, preferably at least Shore D 50 and more preferably Shore D 70. This rigidity assures that the collar 120 is substantially rigid and not prone to significant deformation under typical installation and operational forces. The selected material for the collar 120 also has sufficient elastic recovery, if it does slightly deform, to establish and maintain an adequate seal with the snapband 66 and tubesheet 44. Since the collar 120 is molded it is generally cheaper, easier and faster to fabricate than previous known filter mounting structure.

The collar 120 includes a tubular portion 122. An annular surface 124 extends from the collar 120. The annular surface 124 establishes the position of the filter assembly 28 against an upper surface of the snapband 66 and, thus, relative to the tubesheet 44. The annular surface 124 also forms part of a seal with the snapband 66. Thus, a relatively strong connection and structure with a good seal exists that is capable of supporting the weight of the filter assembly 28 as it hangs from the tubesheet 44 even when the filter assembly has a relatively heavy accumulation of particles.

As shown in FIG. 2, cylindrical filter assembly 28 is positioned downwardly through snapband 66, and the aperture 46 in tubesheet 44, until the annular surface 124 of the collar 120 rests against an upper surface of the snapband as described in detail below.

Figure 3:
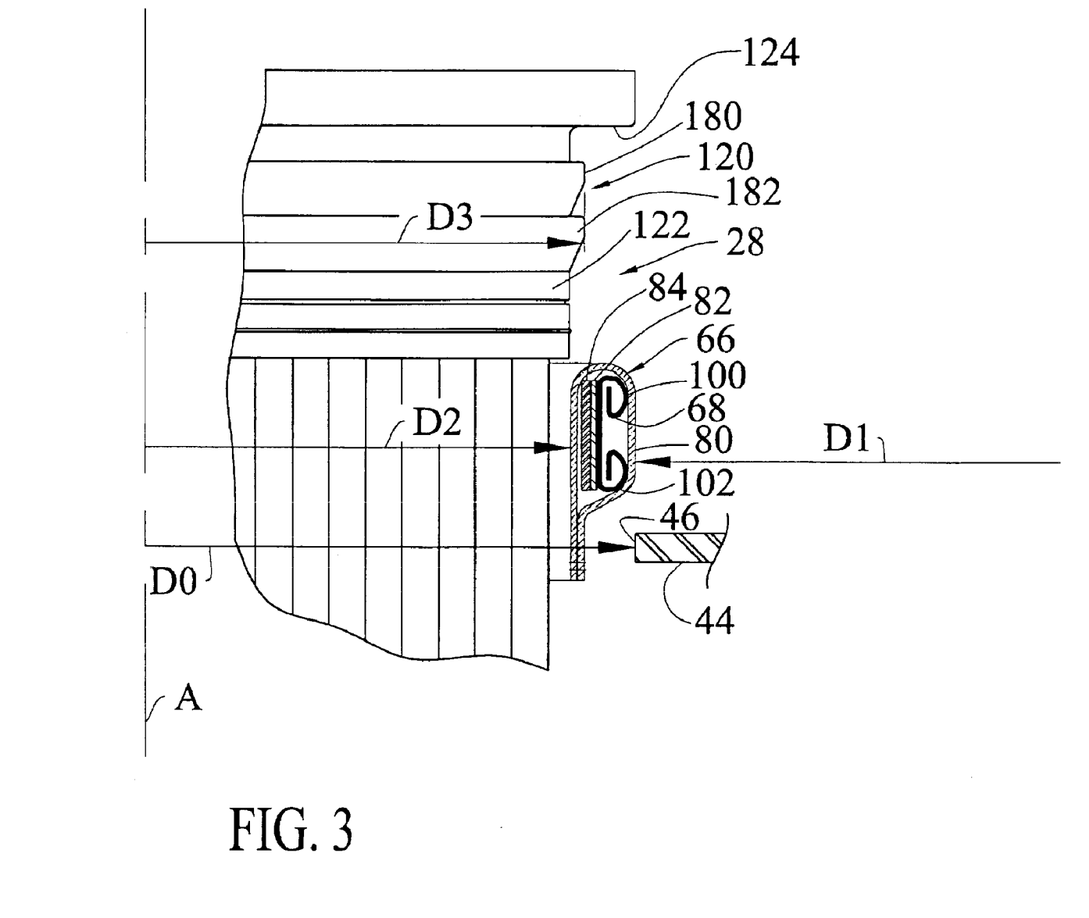
FIG. 3 is an enlarged exploded sectional view of a portion of the filter cartridge illustrated in FIG. 2 and a snapband taken approximately along line 3—3 in FIG. 2.
Figure 4:
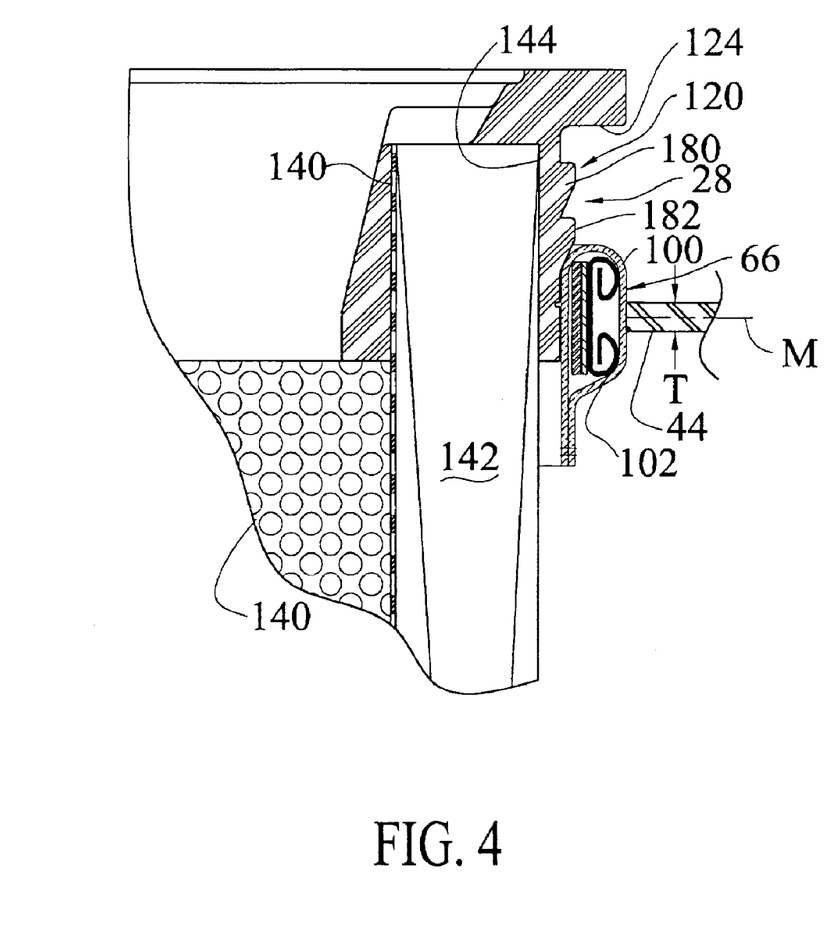
FIG. 4 is a partial sectional view of the filter cartridge and snapband illustrated in FIG. 3 being installed into the tubesheet of the baghouse.
Figure 5:
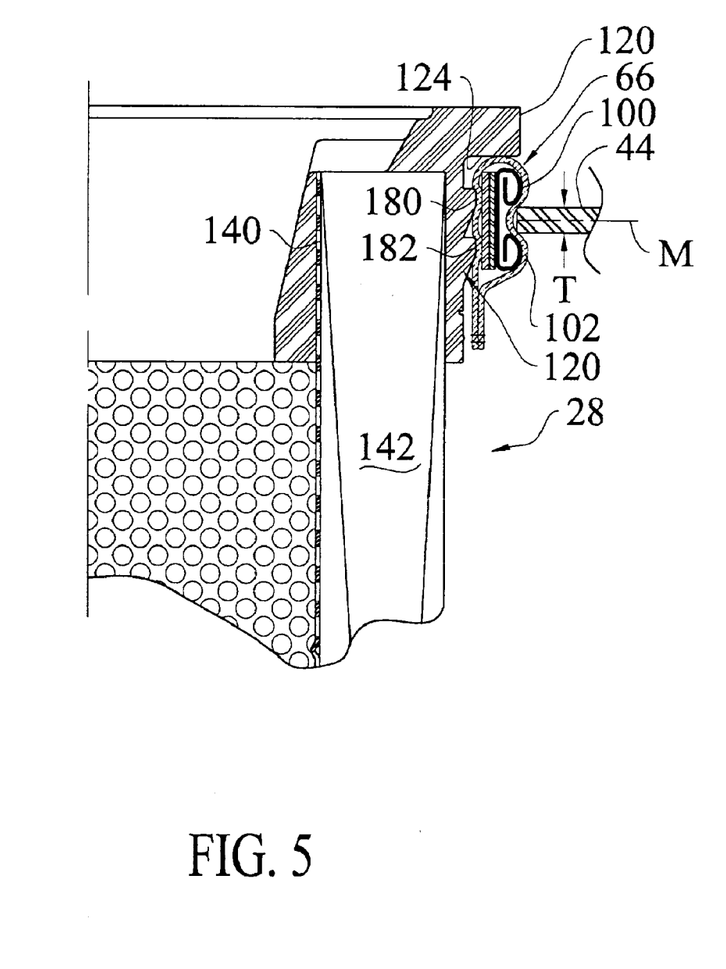
FIG. 5 is a view of the filter cartridge and snapband illustrated in FIG. 4 with a mounting portion of the filter cartridge and snapband installed in the tubesheet.
Figure 6:
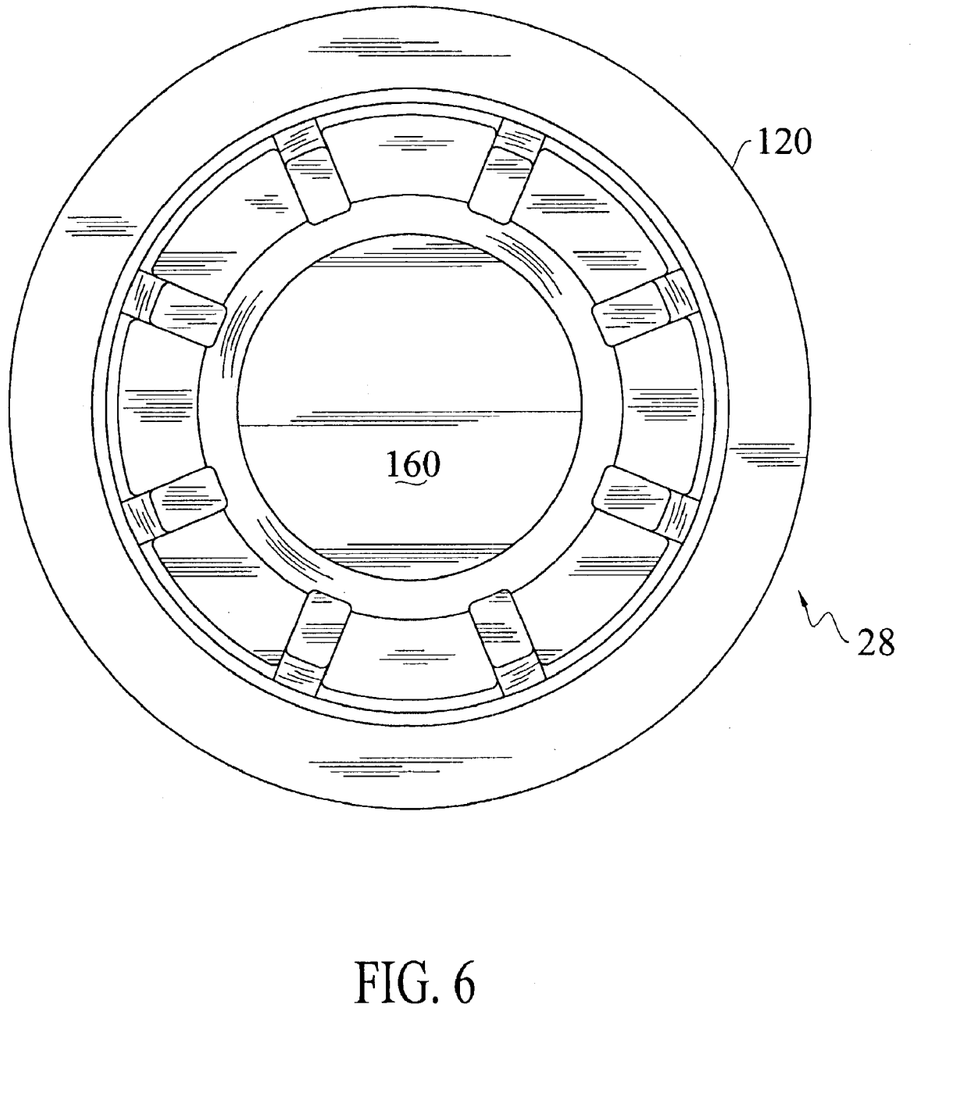
FIG. 6 is a plan view of the filter cartridge illustrated in FIG. 2, taken approximately along the line 6—6 in FIG. 2.

With reference now specifically to FIGS. 3–5, the collar 120 has a pair of continuous projections 180, 182 extending radially outward. Each of the projections 180, 182 extend continuously about the circumference of the collar 120. The projections 180, 182 are longitudinally spaced apart along the axis A, a distance substantially equal to the thickest T of the tubesheet 44. Each of the projections 180, 182 has an outer diameter D3 which is slightly larger than the inner diameter D2 of the snapband 66. Each projection 180, 182 has a frustoconical leading edge surface 184, 186, respectively to facilitate installation and concentric seating of the collar 120 within the snapband 66.

The collar 120 is positioned within the snapband 66 and engage the inner surface of the snapband to effect sealing engagement of the snapband against a portion of the opening 46 in the tubesheet 44. The upper projection 180 extends radially from the collar to force the upper protrusion 100 and fabric 80 of the snapband 66 into sealing engagement with a surface of the tubesheet 44 adjacent the upper portion of the opening 46, as illustrated in FIG. 5. The lower projection 182 further forces the lower protrusion 102 and fabric 80 of the snapband 66 into sealing engagement with another surface of the tubesheet 44. The upper projection 180 is adapted to be located above the thickness T midpoint M of the tubesheet 44 to further force the upper protrusion 100 of the snapband 66 into sealing engagement with the tubesheet 46. The lower projection 182 is adapted to be located below the thickness T midpoint M of the tubesheet 44 to further force the lower protrusion 102 of the snapband 66 into sealing engagement surface of the tubesheet 44.

During an installation procedure, the flexible snapband 66 is positioned into an opening 46 in the tubesheet 44 by inwardly flexing and deforming the snapband assembly to collapse it, positioning it within the opening and then releasing the deformation force to allow the outer surface of the snapband to resiliently bias radially outward into engagement with the inner periphery of the opening. Specifically, the snapband 66 is positioned into opening 66 such that the outwardly facing annular groove 68 defined by the protrusions 100, 102 mates with a surface defining the tubesheet opening 46 and adjacent areas. The filter assembly 28 is inserted into the opening 46 so the pleated element 142 extends through the snapband 66. The collar 120 is then pressed downwardly into the snapband 66 until lower lead edge 186 of the projection 182 engages the snapband 66 as illustrated in FIG. 4. The filter assembly 28 is forced further into the snapband 66. The outwardly extending projections 180, 182 of collar 120 are in the position shown in FIG. 5. Preferably, the uppermost outwardly protruding projection 180 engages with an inner surface of snapband 66 at a location that is substantially at, or slightly lower than, the midpoint M of the thickness T of the tubesheet 44. The lowermost outwardly extending projection 182 preferably engages the inner surface of the snapband 66 at a location below the midpoint M of the thickness T of the tubesheet 44. The projections 180, 182 force the respective protrusions 100, 102 into further continuous sealing engagement with two different surfaces of the tubesheet 44.

As shown in FIG. 5, the dimensions of collar 120 and snapband 66 are such that, when collar is properly positioned within the snapband, the annular surface 124 of the collar rests on the upper surface of the snapband. This is highly desirable because loads applied to the collar 120 of the filter assembly 28, such as when workers are walking thereon, are transmitted downwardly to the snapband 66 and tubesheet 44 and do not adversely effect the seal established by the snapband.

The present invention is highly useful for providing an effective dust-tight seal between a filter assembly 28 and baghouse tubesheet 44. The present invention is also easy to manufacture, install, and replace, and may be subjected to loads which will not cause the seal to be broken. The filter assembly 28 of the present invention may be walked on after it is installed in a baghouse 20 and not lose its seal. This is attributable to the new rigid non-metallic collar 120 that will not deform during such loads and retains its shape against the snapband 66 that it was installed with.

From the above description of preferred embodiments of the invention, those skilled in the art will perceive improvements, changes and modifications. Such improvements, changes and modifications within the skill of the art are intended to be covered by the appended claims.

Having described at least one preferred embodiment of the invention, what is claimed is:

1. A filter cartridge for use in a baghouse having a tubesheet with a plurality of openings in which a flexible snapband is biased towards engagement with a surface defining one of the openings in the tubesheet and is adapted to receive a portion of said filter cartridge, the snapband having a first surface and a second surface with a pair of protrusions separated by a groove adapted to receive a peripheral edge of one of the tubesheet openings and the pair of protrusions sealingly engage surfaces of the tubesheet; said filter cartridge comprising:

filter media;
 structure for supporting said filter media;
 a rigid non-metallic tubular collar integrally formed with said filter media and said structure to secure said filter media and said structure to said collar, said collar including a pair of longitudinally spaced continuous projections extending radially from said collar, said collar further including an annular surface extending from said collar for establishing the position of said filter cartridge relative to the tubesheet; and
 said collar adapted to be positioned within the snapband and said projections engaging the first surface of the snapband to effect sealing engagement of the snapband against a portion of the opening in the tubesheet, said first projection extending radially from said collar to further force one portion of the snapband into sealing engagement with a surface of the tubesheet on one side of the thickness midpoint of the tubesheet, said second projection extending radially from said collar to further force another portion of the snapband into sealing engagement with another surface of the tubesheet on another side of the thickness midpoint of the tubesheet.

2. The filter cartridge of claim 1 wherein said collar is molded from a plastic material to capture portions of said filter media and said structure.

3. The filter cartridge of claim 2 wherein said molded collar has a hardness of at least Shore D 30.

4. The filter cartridge of claim 1 wherein a first one of said projections is adapted to be located above the thickness midpoint of the tubesheet to further force a first one of the protrusions of the snapband into sealing engagement with the surface of the tubesheet.

5. The filter cartridge of claim 1 wherein a second one of said projections is adapted to be located below the thickness midpoint of the tubesheet to further force another one of the protrusions of the snapband into sealing engagement with the another surface of the tubesheet.

6. A filter assembly for use in a baghouse having a tubesheet with a plurality of openings in which a flexible snapband is adapted to receive said filter cartridge and be biased towards engagement with a surface defining one of the openings in the tubesheet, the snapband having a first surface and a second surface with a pair of protrusions separated by a groove that is adapted to receive a peripheral edge of one of the tubesheet openings and the pair of protrusions sealingly engage surfaces of the tubesheet; said filter assembly comprising:

filter media;

structure for supporting said filter media;

a rigid non-metallic collar, said filter media and said structure being secured to said collar; and said collar adapted to be positioned within the snapband and engage the first surface to effect sealing engagement of at least one protrusion of the snapband against a portion of the tubesheet adjacent the opening at a location above the thickness midpoint of the tubesheet.

7. The filter assembly of claim 6 wherein said collar is molded from a plastic material to capture portions of said filter media and said structure and further includes an annular surface extending from said collar having for establishing the position of said collar relative to the tubesheet.

8. The filter assembly of claim 7 wherein said molded collar has a hardness of at least Shore D 30.

9. The filter assembly of claim 6 further including a first continuous projection extending radially from said collar, said first projection is adapted to be located above the thickness midpoint of the tubesheet to further force a first one of the protrusions of the snapband into sealing engagement with the surface of the tubesheet.

10. The filter assembly of claim 9 further including a second continuous projection extending radially from said collar and axial spaced from said first projection wherein said second projection is adapted to be located below the thickness midpoint of the tubesheet to further force another one of the protrusions of the snapband into sealing engagement with another surface of the tubesheet.

11. A filter cartridge for use in a baghouse having a tubesheet with a plurality of openings in which a flexible snapband is adapted to receive said filter cartridge and be biased towards engagement with a surface defining one of the openings in the tubesheet, the snapband having a first surface and a second surface with a pair of protrusions separated by a groove that is adapted to receive a peripheral edge of one of the tubesheet openings and the pair of protrusions sealingly engage surfaces of the tubesheet; said filter cartridge comprising:

filter media;

structure for supporting said filter media;

a rigid non-metallic collar, said filter media and said structure being secured to said collar; and said collar adapted to be positioned within the snapband and engage the first surface of the snapband at a location above the thickness midpoint of the tubesheet to effect sealing engagement of a portion of the second surface of the snapband against a portion of the tubesheet adjacent the opening.

12. The filter cartridge of claim 11 wherein said collar is integrally formed with said filter media and said structure.

13. The filter cartridge of claim 12 wherein said collar is molded from a plastic material to capture portions of said filter media and said structure.

14. The filter cartridge of claim 13 wherein said molded collar has a hardness of at least Shore D 30.

15. The filter cartridge of claim 11 further including a first projection extending radially from said collar to further force the snapband into sealing engagement with the surface of the tubesheet.

16. The filter cartridge of claim 15 wherein said first projection is adapted to be located above the thickness midpoint of the tubesheet to further force a first one of the protrusions of the snapband into sealing engagement with the surface of the tubesheet.

17. The filter cartridge of claim 16 further including a second projection extending radially from said collar and axial spaced from said first projection wherein said second projection is adapted to be coated below the thickness midpoint of the tubesheet to further force another one of the protrusions of the snapband into sealing engagement with the another surface of the tubesheet.

18. The filter cartridge of claim 15 wherein said projection is continuous.

19. The filter cartridge of claim 11 further including an annular surface extending radially from said collar having for establishing the position of said collar relative to the tubesheet.

* * * * *